United States Patent Office 3,525,711
Patented Aug. 25, 1970

3,525,711
SELF-EXTINGUISHING SYNTHETIC PLASTICS MATERIALS BASED ON A DI-ALKYL ESTER OF 2,3-DIHYDROXYPROPANE PHOSPHONIC ACID COMPONENT
Herbert Jenkner, Cologne-Deutz, Germany, assignor to Chemische Fabrik Kalk G.m.b.H., Cologne-Kalk, Germany
No Drawing. Filed Aug. 13, 1965, Ser. No. 479,669
Claims priority, application Germany, Aug. 14, 1964, C 33,644; Oct. 3, 1964, 1,495,385
Int. Cl. C08g 17/133, 22/30, 51/54
U.S. Cl. 260—47
6 Claims

ABSTRACT OF THE DISCLOSURE

Flame resistance is imparted to polyurethane, polyester or epoxy resins by replacing a portion of the starting polyhydroxy compound normally employed as one of the reaction components with a diol selected from the group consisting of
(a) diols of the general Formula I

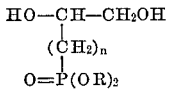

(b) diols of the general Formula II

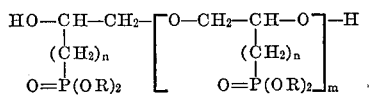

(c) isomers of diols of the general Formula II in which Formulae I and II $n$ is a whole number between 1 and 24, $m$ is a whole number between 1 and about 2,000, and R are like or different radicals selected from the group consisting of methyl, ethyl, propyl, isopropyl, butyl, isobutyl, cyclopentyl, cyclohexyl, phenyl, toluyl and benzyl radicals and such radicals in which the hydrogen is partly substituted by a halogen selected from the group consisting of Cl and Br so as to provide a 1 to 10 wt. percent phosphorus content in the starting mixture from which the resins are produced.

---

This invention concerns a method of making self-extinguishing synthetic plastics materials.

Synthetic plastics which contain oxygen, such as for example polyurethane, polyester, polyepoxide plastics and similar polymers are known to be readily ignitible and continue to burn of themselves once ignited. A fire spreads particularly quickly over foamed mouldings made from these synthetic plastics because, by reason of their porosity, the said mouldings offer a substantially greater surface to the flame than would nonfoamed mouldings. By reason of this combustibility, the said oxygen-containing synthetic plastics cannot be used for many industrial purposes. Therefore, numerous attempts have been made to decrease the inflammability of these oxygen-containing synthetic plastics by adding a proportion of so-called flame-inhibiting additives.

Thus, the inflammability of polyester plastics can be decreased by addition of organic chlorine and/or bromine compounds to the polymerisation mixtures. Tetrachlorophthalic acid, hexachloroendomethylene-tetrahydrophthalic acid, and the anhydrides thereof, are known to be particularly efficient in this respect. In most cases, these acids, instead of the otherwise conventionally used phthalic acid, are introduced into the mixtures from which the unsaturated polyesters are made and which consist essentially of the unsaturated dicarboxyl acids, maleic acid, fumaric acid or their anhydrides and the polyhydric alcohols, ethylene glycol, diethylene glycol, glycerine or trimethylol propane. When these mixtures are condensed to form unsaturated polyesters, the aforesaid chlorine-containing acids or the anhydride forms thereof are incorporated into the polyester molecules formed. An adequate flame protection in those polyester plastics which are produced from these unsaturated products of condensation and cross-linking components such as for example styrene, can only be ensured if the unsaturated condensation products contain large quantities of organic chlorine and/or bromine compounds. However, such large quantities of halogenous additives substantially reduce the desirable chemical and physical properties and particularly the resistance to light, of polyester plastics.

For this reason, the knowledge that the amount of chlorine-containing organic compounds in polyester plastics can be reduced while retaining the same flame-protective effect, if, not only the aforesaid cyclic organohalogen compounds, but also di- or triesters of phosphoric acid, such as triethyl, triallyl, triphenyl and tricresyl phosphate and similar compounds, are added to the mixtures which form the polyesters, did indeed constitute an advance in the art. The alcoholic components of these esters should consist of saturated or unsaturated hydrocarbon radicals with 1 to 8 C-atoms per radical. However, the polyester fabrics made in known manner from such mixtures must also, in addition to 1.0 to 1.5% by weight phosphorus also contain some 12 to 16% by weight chlorine, as otherwise adequate flameproofing will not be guaranteed.

According to another method, polyester plastics can be flameproofed when neutral phosphoric acid esters containing as alcohol components three saturated or unsaturated hydrocarbon radicals, of which at least one is brominated, such as tri-(dibromopropyl)-phosphate or dibromopropyldiallyl-phosphate, are added to the polymerisation mixtures of the unsaturated polyesters and, hence, to the copolymerisable compounds, prior to the polymerisation process.

It is however also possible to introduce the halogen and the phosphorus into the mixtures from which the polyester plastics are made in separate compounds. For example, according to another method, the phosphorus can be introduced into the mixture in the form of a neutral phosphoric acid ester, the acid or alcohol component of which is already halogenated or contains halogenated groups.

When the aforesaid phosphoric acid esters contain no free acid groups or have no polymerisable double bonds in the molecule, they are present in the form of a fixed solution in the polyester plastic. Where a free acid group is present, the phosphoric acid esters can be condensed with the polyester, while polymerisable double bonds in the phosphoric acid ester molecule afford an opportunity of polymersing such phosphoric acid esters into the polyester plastic. As tests and the methods described show, polyester plastics can only be described as self-extinguishing if they contain at least 0.5 to 1% by weight phosphorus and 15 to 30% by weight halogen. Such proportions of halogen in polyester plastics however result not only in a considerable reduction in resistance to light but also an increase in the brittleness of the polyester materials. Furthermore, the phosphoric acid esters incorporated or built into the polyester plastics hydrolyze in course of time. The resulting products of hydrolysis contribute to a breakdown of the polyester molecules which finally leads to a deterioration in the mechanical and physical properties of the polyester plastics concerned.

Since the resistance to hydrolysis of phosphonic acid esters is better than that of phosphoric acid esters, it is preferable, according to another previously proposed method to polymerise a polyester prepared by using condensable halogen compounds with monomeric vinyl, acrylic or allyl compounds, in the presence of α-oxyalkylphosphonic acid dialkyl or diallyl esters of the following formula:

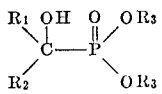

in which $R_1$, $R_2$ and $R_3$ represent alkyl or vinyl groups. $R_1$ and $R_2$ can however be hydrogen atoms. But the polyester plastics made up according to this method must, in addition to having a phosphorus content of 1 to 1.5% by weight, also contain 15 to 30% by weight halogen if satisfactory flame-resistance is to be achieved.

It has also been proposed to introduce and jointly to condense into the mixtures from which polyesters are formed phosphorus in the form of phosphorus-containing diols of the general formula:

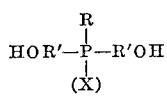

in which R and R' are hydrocarbon radicals, such as methyl, ethyl, propyl, isopropyl, cyclohexyl or methylene, di- to polymethylene or similar radicals and where X, if present, represents oxygen or sulphur.

If these diols are less sensitive to hydrolysis, they can only be made by an industrially expensive process so that their importance in large-scale industrial use is considerably decreased.

In order to flameproof polyurethanes, it is substantially the halogen and/or phosphorus compounds mentioned already for polyester plastics which are used. However, such use is burdened by the same deficiencies as is the use of the aforesaid halogen and/or phosphorus compounds in polyester plastics. For example, those halogen-phosphorus compounds such as for example tri-(dichloropropyl)-phosphate or tri-(dibromopropyl)-phosphate migrate, in the case of polyurethane plastics, particularly polyurethane foams, slowly to the surface of the plastics material, so that its inflammability increases again. Other halogen and phosphorus containing compounds such as for example bromoethyl diglycol phosphate, are, as with the polyesters, built into the macromolecules of the polyurethane plastics via P-O-C bonds. By virtue of the sensitivity of these P-O-C bonds to hydrolysis, the macromolecule of the polyurethane plastic is just as split up as that of the polyester plastic. Also in the polyurethane plastics, the products of hydrolysis of the organophosphorus compounds accelerate the otherwise extremely slow breakdown of the macromolecules.

In order to overcome these disadvantages of the previously proposed possibilities of flameproofing oxygen-containing synthetic plastic materials, other phosphorus-containing organic additives were sought which, as regards their flameproofing action, are equivalent to the earlier products, though they do not have the latters' disadvantageous features.

According to the invention, there is provided a method of making a self-extinguishing or not readily combustible synthetic plastics material by reaction of a starting material mixture which contains as an essential component an organic compound having a plurality of free hydroxyl groups in the molecule, said compound being selected from the group consisting of polyfunctional alcohols, polyethers with free hydroxyl groups, unsaturated polyesters with free hydroxyl groups and bis-(hydroxyphenyl)-alkylene, wherein, before such mixture is reacted to form the synthetic plastic, a diol selected from the group consisting of (a) diols of the general Formula I

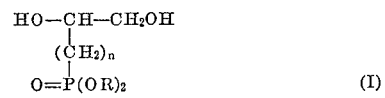

(b) diols of the general Formula II

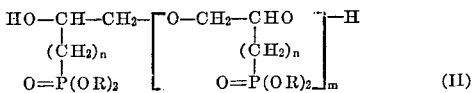

and (c) isomers of diols of the general Formula II, in which Formulae I and II $n$ is a whole number between 1 and 24, $m$ is a whole number between 1 and about 2,000, and R are like or different aliphatic, cycloaliphatic or aromatic hydrocarbon radicals selected from the group consisting of methyl, ethyl, propyl, isopropyl, butyl, isobutyl, cyclopentyl, cyclohexyl, phenyl, toluyl and benzyl radicals, is added to the starting material mixture in such a quantity that the phosphorus content of the mixture is between 1 and 10% by weight.

The isomers may for example have the following structure

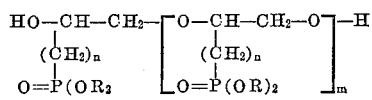

or

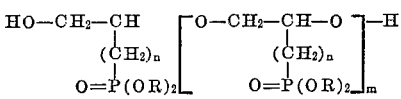

or

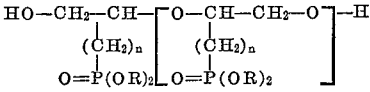

or a similar molecular structure. The only essential feature for the utility of the compounds of the general Formula II for the purpose according to the invention is that these compounds, through a C-P bond, contain a bonded organic radical carrying two alcoholic hydroxyl groups, the said organic radicals being linked together by ether linkages.

As hereinafter described the R groups may contain one or more chlorine or bromine atoms as substituents. The invention also extends to the combustibility-reducing agents and polymerisation mixtures just described.

For the production of unsaturated polyesters, unsaturated polybasic carboxyl acids, such as fumaric acid or maleic acid, which have at least one polymerisable double bond in the molecule, or the anhydrides thereof, may be used. To these polybasic carboxylic acids or anhydrides, further polybasic carboxylic acids or their anhydrides may be added which have no polymerisable double bonds in the molecule. These acids or their anhydrides or mixtures thereof are then condensed with polyfunctional alcohols, particularly diols such as ethylene glycol, propylene, glycol, butylene glycol, diethylene glycol or mixtures thereof, the said diols normally being used in excess.

According to the invention, a proportion of the polyfunctional alcohols is replaced before condensation, by compounds of the general Formula I or II, advantageously in such proportions that the OH-number of the substituted proportion of polyfunctional alcohols roughly corresponds to the OH-number of the diol used. The mixtures obtained are then condensed. The self-extinguishing or not readily combustible plastics are finally obtained by dissolving these mixtures in a solvent, such as styrene, which is adapted to be polymerised therewith, and which has at least one polymerisable double bond in the molecule.

In the production of polyurethanes, polyfunctional isocyanates, particularly aromatic diisocyanates such as toluylene diisocyanate or even polymethylenepolyphenylisocyanates, may be reacted with polyesters or polyethers which contain free hydroxyl groups. According to the invention, a proportion of the polyesters or polyethers is, before the reaction with the isocyanates, replaced by compounds of the general Formula I or II. It is advantageous that the hydroxyl group content of the added compounds of the general Formula I or II be virtually or completely equivalent to the hydroxyl group content of the polyester or polyether replaced. Also, polyurethanes can be produced which are made from compounds of the general Formula II to form a compound containing a single hydroxyl group.

Similarly polyepoxides may be obtained by reaction of bis-(hydroxyphenyl)-propanes with epihalogenohydrins. According to the invention, in these mixtures, a proportion of the bis-(hydroxyphenyl)-propane is replaced by compounds to the general Formula I or II, the hydroxyl group content of the substituted bis-(hydroxyphenyl)-propane being virtually or entirely equivalent to the added compounds to the general Formula I or II.

To these mixtures made up with the addition of compounds of the general Formula I or II are then added catalysts or accelerators adapted to accelerate polymerisation or polycondensation of the polymerisable or polycondensable portions of these mixtures. For the mixtures which consist essentially of polyesters and of compounds polymerisable therewith, it has been found that organic peroxides or hydroperoxides such as benzoyl peroxide, cumene hydroperoxide and azo-bis-isobutyrodinitrile are suitable polymerisation catalysts while amines such as p-phenylene diamine, p,p'-diaminodiphenylmethane have been found to be ideal accelerators. As catalysts, it is advantageous to add to the polyurethane mixtures, organic tin compounds such as dibutyl stannous dilaurate, dibutyl stannous dimaleate and/or tertiary amines such as triethylene diamine, as well as emulsifiers such as silicone oil or other nonionogenic surface-active substances. If these mixtures are to be used for manufacturing polyurethane foams, then further substances such as chlorofluoromethanes, must be added to them which, under the polymerisation conditions, vaporize or, like water, react with components of the mixture to produce gases.

It is also possible to add dyestuffs and fillers or other known and customary additives such as glass or asbestos fibres to the mixtures formed according to the invention.

The mixtures obtained by this means are then polymerised or polycondensed in per se known manner and are shaped into solid, and if need be, foamed, products. In many cases, it will be understood that, due to the addition of compounds of the general Formula I or II according to the invention, a delay in the polymerisation or polycondensation and hardening of the mixture will result. This delay can, however, be eliminated by choosing appropriate catalysts or larger quantities of catalysts or by other measure such as longer hardening times, etc. These conditions and measures can be easily ascertained by simple preliminary tests.

In the event that the reduction in combustibility of the synthetic plastics produced is to be achieved solely by the phosphorus incorporated with the compounds of the general Formula I or II, the added compounds of the general Formula I or II should be advantageously such that the phosphorus content of the synthetic plastics amounts to approximately 1 to 10% by weight.

In many cases, however, it is more advantageous if the mixtures which are to be used for the method according to the invention contain not only phosphorus but also chlorine and/or bromine as further flameproofing components. Thes halogens amplify and supplement the flameproofing action of the phosphorus and therefore make it possible to reduce the phosphorus content in the mixtures of 1 to 2½% by weight if 8 to 5% by weight chlorine and/or bromine are contained therein. The chlorine and/or bromine can be introduced into the mixtures wholly or partly with the compounds of the general Formula I or II, if the hydrocarbon radicals designated by R have their H-atoms at least partly substituted by chlorine and/or bromine. The chlorine and/or bromine can however also be incorporated into the mixtures alone or through other compounds, for example through polyesters, if halogen-containing multivalent alcohols and/or carboxylic acids are used for their manufacture. In polyurethanes the chlorine and/or bromine can be incorporated in the form of halogen-containing unsaturated polyesters or polyethers. In polyepoxides, chlorine and/or bromine can be very readily incorporated in the form of appropriately halogenated bis-(hydroxyphenyl)-propane, wherein the halogen atoms can be bonded both to the aromatic nucleus and the methyl group of this compound. The halogenated compounds naturally replace equivalent quantities of the corresponding halogen-free compounds.

The compounds of the general Formulae I and II which are to be used according to the invention are readily accessible in good yield. Thus, by the reaction of (possibly chlorine and/or bromine-containing) esters of phosphorous acid with (possibly halogen-containing) epoxides of the paraffin hydrocarbons such as epichloro or epibromohydrin, epoxy compounds of the general Formula III:

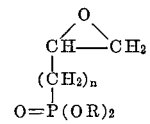

in which R and $n$ have the same significance as in the general Formula I, can be obtained. The oxirane ring can easily be split by dilute acids into two hydroxyl groups, producing compounds of the general Formula I.

To produce compounds of the general Formula II, compounds of the general Formula I are reacted in appropriate proportions with compounds of the general Formula III in the presence of Friedel-Crafts catalysts, such as for example boron trifluoride etherate. It is however also possible to react the epoxy compounds of the general Formula III directly in the presence of Friedel-Crafts catalysts. From these reaction products, it is possible, by alkaline hydrolysis, to obtain the desired compounds of the general Formula I or II.

The compounds of the general Formulae I and II which are to be used according to the invention are chemically bonded through a nonhydrolysable P-C bond and two OH groups on the same hydrocarbon radical, in the molecular linkage of the synthetic plastics material and in consequence cannot migrate. A further technical advantage of the use of the compounds of general Formulae I and II according to the invention consists in that, in contrast to similar phosphorus compounds which contain only one hydroxyl group per hydrocarbon radical, the compounds of the general Formulae I and II do not produce any breakup of the chain reactions which take place during polymerisation or polycondensation. Although the compounds of the general Formulae I and II are themselves indeed more difficult of access due to hydrolysis than are the corresponding esters of phosphoric acid, the nature of the incorporation of the compounds of general Formulae I and II means that the macromolecule will not be split even if such hydrolysis should occur.

Incorporation of the compounds of the general Formulae I and II into the synthetic plastics according to the invention, affects their mechanical and physical properties only to an inconsiderable degree because these compounds of the general Formulae I and II have a high content of phosphorus and, even when added in very small quantities, result in a high standard of flameproofing.

The presence of the compounds of the general Formula I or II alone in the synthetic plastics manufactured according to the invention diminishes their combustibility sufficiently for these plastics to be described as self-extinguishing or difficult to burn. This flameproofing achieved by compounds of the general Formula I or II is enhanced by the presence of organically bonded chlorine and/or bromine which can be incorporated into the plastics by the measures described hereinbefore.

In the ensuing paragraphs, examples will be given of the implementation of the method according to the invention and the results of tests in which the behaviour of synthetic plastics produced according to these examples has been examined.

Testing of reaction to flames was carried out according to ASTM Specification 635 for compact plastics and ASTM Specification 1692 in the case of foam plastics.

According to ASTM Specification 635, test bars measuring 13 x 6.5 x 127 mm. are cut from the compact synthetic plastics which are to be tested. These test bars are clamped horizontally at one end in a standard clip so that the narrow side of the largest of the lateral faces forms an angle of 45° with the horizontal. Under this sample and at a distance of 9.6 mm., also held by a clamp, there is attached a large Bunsen burner gauze measuring approximately 10.3 sq. cm. with 58 meshes/sq. cm. and measuring 116 mm. long. For the flame test, the free end of the test bar was burnt with a Bunsen flame for 30 seconds and the time taken for the sample to extinguish the flame measured.

According to ASTM Specification 1692, test bars 15.24 cm. long are cut from the foam materials to be tested, the square base of the samples having an edge length of 1.27 cm. As a means of holding these test bars during the test, a wire gauze of 2.5 meshes/sq. cm. is folded into a channel with a 90° angle of opening. In this channel which is set up without tension, at an angle of 30° inclination, the test bar is so placed that it protrudes by 1.27 cm. from the lower end of the channel. Below the end of the test bar protruding from the channel, a Bunsen burner is held for 5 seconds with its flame, 5 cm. long, just touching the test bar; the time which it takes for the sample to extinguish itself after the flame has been removed, is measured.

EXAMPLE 1

196 parts by weight maleic anhydride, 148 parts by weight phthalic anhydride, 212 parts by weight diethylene glycol and 68 parts by weight ethylene glycol are condensed with 212 parts by weight 2,3-dihydroxypropanephosphonic acid diethyl ester at a temperature of 180 to 200° C. (at the end of the reaction in a vacuum), to form a polyester. From the condensation mixture, approximately 49 parts by weight water and 83 parts by weight ethanol are distilled off. The polyester obtained is dissolved in styrene so that the solution formed contains 30% by weight styrene. After the addition of 0.5 part by weight benzoyl peroxide, this moulding mixture is polymerised and hardened while it is being shaped. The reaction to flames of this synthetic plastic is tested according to ASTM 635, which shows that the synthetic plastic extinguishes itself immediately the flame is removed.

EXAMPLE 2

15.13 parts by weight of a polyether (hydroxyl number 492), 21.37 parts by weight liquid 4,4'-diphenylmethane diisocyanate, 13 parts by weight trichlorofluoromethane, 0.3 part by weight silicone oil and 0.3 part by weight stannous octoate as well as 8.5 parts by weight 2,3-dihydroxypropanephosphonic acid diethyl ester (hydroxyl number 431, phosphorus content 14.9%) are reacted to cause foaming. The hard polyurethane foam thus obtained is tested according to ASTM Regulations 1692. On completion of the attempts to ignite the material, the samples extinguish themselves within 10 seconds.

EXAMPLE 3

Production of a flame-resistant polyurethane soft foam: 90 parts by weight polyether (manufactured from trimethylolpropane and propyleneoxide; hydroxyl number 55, molecular weight 3,000), 40 parts by weight toluylene diisocyanate, 0.5 part by weight triethylenediamine, 1 part by weight silicone oil, 0.3 part by weight of a commercial amino catalyst and 0.3 part by weight water as well as 10 parts by weight phosphorus-containing polyether alcohol (hydroxyl number 80, phosphorus content 16.2%) are caused to foam. The soft polyurethane foam thus obtained is tested according to ASTM Specification 1692. On completion of the application of the flame the samples extinguish themselves within 10 seconds.

EXAMPLE 4

Manufacture of a flame-resistant polyurethane soft foam; 90 parts by weight polyether (manufactured from trimethylolpropane and propylene oxide; hydroxyl number 55, molecular weight, 3000), 40 parts by weight toluylene diisocyanate, 0.5 part by weight triethylenediamine, 1 part by weight silicone oil, 0.3 part by weight of a commercial amino catalyst and 0.3 part by weight water as well as 5.66 parts by weight phosphorus-containing polyether alcohol (hydroxyl number 90, phosphorus content 16.2%) and 4.24 parts by weight bromine-containing polyether alcohol (made by the addition of epibromohydrin to ethylene glycol; hydroxyl number 94, bromine content 53%) are caused to foam. The soft polyurethane foam thus obtained is tested according to ASTM Specification 1692. On completion of the application of the flame, the samples extinguish themselves within 10 seconds.

EXAMPLE 5

Manufacture of a flame-resistant polyurethane hard foam: 18 parts by weight sorbitol polyether (hydroxyl number 442), 22.2 parts by weight liquid 4, 4'-diphenylmethane diisocyanate, 3.6 parts by weight pentabromodiphenyl ether, 13 parts by weight trichloromonofluoromethane, 0.3 part by weight silicone oil and 0.3 part by weight stannous octoate, as well as 6.2 parts by weight of a phosphorus-containing polyether alcohol (made by the reaction of glycidylphosphonic acid diethyl ester with boron trifluoride etherate; hydroxyl number 80, phosphorus content 16.3%, molecular weight 864) are caused to foam. The hard polyurethane foam thus obtained is tested according to the ASTM Specification 1692. On completion of the application of the flame, the samples extinguish themselves within 10 seconds.

EXAMPLE 6

Manufacture of a flame-resistant polyurethane hard foam; firstly, 12.6 parts by weight sorbitol polyether (hydroxyl-number 442) was mixed with 17.9 parts by weight toluylene diisocyanate. The thickly viscous mass produced, 10 parts by weight sorbitol polyether, 3.6 parts by weight pentabromodiphenyl ether, 13 parts by weight trichlorofluoromethane, 0.3 part by weight silicone oil and 0.2 part by weight stannous octoate as well as 6.2 parts by weight of a phosphorus-containing polyether alcohol (made by the reaction of glycidylphosphonic acid diethyl ester with boron trifluoride etherate; hydroxyl-number 80, phosphorus content 16.3%, molecular weight 864) are caused to foam. The hard polyurethane foam thus obtained is tested according to the ASTM Specification 1692. On completion of the application of the flame, the samples extinguish themselves within 10 seconds.

What is claimed is:

1. Polymerization mixtures for the production of flame resistant synthetic resins comprising (a) phosphorus-free organic compounds containing free hydroxyl groups (b) polyisocyanates (c) unsaturated polybasic carboxylic acids with at least one polymerizable double bond or the anhydrides thereof (d) epihalohydrin and (e) diols of the general formula

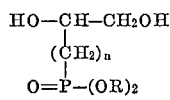

wherein $n$ is a whole number from 1 to 24, and R are like or different radicals methyl, ethyl, propyl, isopropyl, butyl, isobutyl, cyclopentyl, cyclohexyl, phenyl, toluyl, benzyl or such radicals containing chloro or bromo substituents, the diol being present in an amount to provide a phosphorus content of 1 to 10 weight percent, (a), (b) and (e) being a polymerization mixture for polyurethane resins, (a), (c) and (e) being a polymerization mixture for polyester resins and (a), (d) and (e) being a polymerization mixture for epoxy resins.

2. The mixture of claim 1 wherein $n$ is 1 and R is methyl, ethyl, propyl, isopropyl, butyl or isobutyl.

3. The mixture of claim 2 wherein R is ethyl.

4. The mixture of claim 1 wherein compounds (a) are polyfunctional alcohols, polyethers with free hydroxyl groups, unsaturated polyesters with free hydroxyl groups, unsaturated polyesters with free hydroxyl groups or bis-(hydroxyphenyl)-alkylene.

5. The mixture of claim 1 wherein compounds (a) are ethylene glycol and diethylene glycol, compounds (c) maleic anhydride and phthalic anhydride and compound (e) the diethylester of 2,3-dihydroxypropane phosphonic acid.

6. The mixture of claim 1 wherein compound (a) is a polyether, compound (b) is 4,4'-diphenylmethane diisocyanate and compound (e) is the diethylester of 2,3-dihydroxypropane phosphonic acid.

References Cited

UNITED STATES PATENTS

| | | | |
|---|---|---|---|
| 2,579,810 | 12/1951 | Fields | 260—461.1 |
| 2,701,225 | 2/1955 | Lorenz | 167—22 |
| 2,758,971 | 8/1956 | Mikeska | 252—32.7 |
| 3,184,497 | 5/1965 | Brack | 260—461 |
| 3,382,301 | 5/1968 | Hechenbleikner et al. | 260—953 |

DONALD E. CZAJA, Primary Examiner

H. S. COCKERAM, Assistant Examiner

U.S. Cl. X.R.

260—2.5, 75, 77.5, 45.7, 953